(No Model.)
F. L. MARSHALL
DENTAL PLUGGER.
No. 597,469. Patented Jan. 18, 1898.

Figure 3:
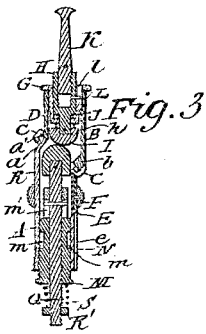

Fig. 3ᴬ. 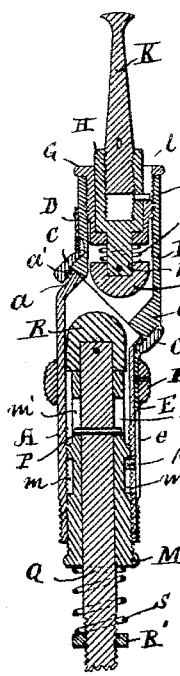
Fig. 4.

Fig. 6.  Fig. 7. 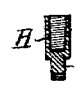 Fig. 9. 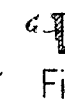 Fig. 11. 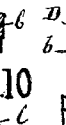 Fig. 13.  Fig. 14.  Fig. 17. 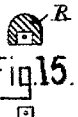 Fig. 19. 

Fig. 8. Fig. 16. Fig. 18.
Witnesses.
Laura E. Hayward
Edward B. Brown
Inventor.
Frank L. Marshall
by Edwin Plante
attorney.

UNITED STATES PATENT OFFICE.

FRANK L. MARSHALL, OF BOSTON, MASSACHUSETTS.

DENTAL PLUGGER.

SPECIFICATION forming part of Letters Patent No. 597,469, dated January 18, 1898.

Application filed October 28, 1896. Serial No. 610,283. (No model.)

*To all whom it may concern:*

Be it known that I, FRANK L. MARSHALL, a citizen of the United States, and a resident of Boston, in the county of Suffolk and State of Massachusetts, have invented certain new and useful Improvements in Dental Pluggers or Mallets, of which the following, taken in connection with the accompanying drawings, is a specification.

My invention relates to certain improvements in dental pluggers or mallets, the object being to produce an adjustable angular plugger or mallet; and the invention consists in a novel construction, arrangement, and combination of parts comprising the plugger, as hereinafter set forth, and pointed out in the claims.

Figure 1:
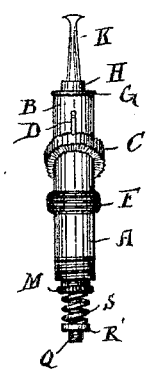
Figure 2:
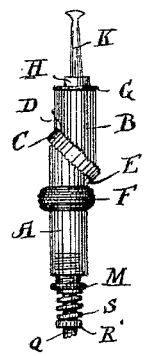
Figure 5:
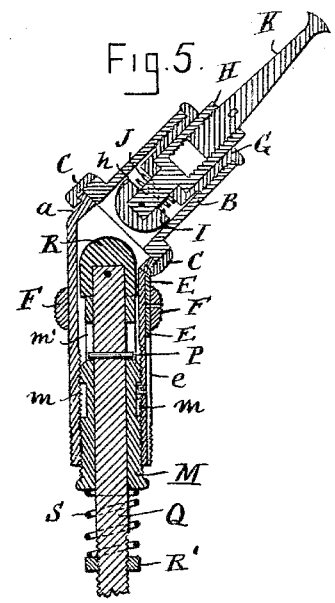
Figures 10, 12, 15, 20:
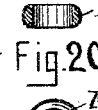

Referring to the accompanying drawings, Figure 1 represents a front view of a dental plugger or mallet embodying my invention. Fig. 2 is a side view of same. Fig. 3 is a longitudinal vertical section of same, showing the spherical blocks in contact as when imparting a blow. Fig. 3ᴬ is a longitudinal vertical section drawn on an enlarged scale and showing the plugger-point in a vertical position. Fig. 4 is a similar view showing the plugger-point set at right angles, and Fig. 5 is a similar view showing the plugger-point set at an angle of forty-five degrees. Figs. 6 to 20 are detail views of the various parts.

A represents the lower, and B the upper, portion of the outer shell or casing of the plugger or mallet. The upper end $a$ of the portion A and the lower end $b$ of the portion B are each formed on an angle of forty-five degrees to the main portions, the portion $a$ being formed with a small flange or lip $a'$ and the portion $b$ with a screw-thread. These two parts are connected together by a coupling-ring C, the upper and lower edges of which are formed with teeth for the purposes hereinafter described. It will be seen that by this arrangement the part B can be turned to any desired angle in relation to the part A.

In order to prevent the portion B from being accidentally unscrewed, I secure to the portion B a small spring D, the free end of which takes into the teeth formed on the upper side of the ring C, and in order to securely hold the portion B in position after it has been set a slide E, having teeth at its upper end, is let into a groove $e$, formed in one side of the casing A, which slide is attached to a sliding split ring F, having its outer surface roughened, so that it can be easily adjusted by the operator when desired. The teeth of the slide E when in contact with the teeth on the under side of the ring C securely locks the two parts A and B together, the split ring F firmly gripping the casing A, so that it cannot shift of its own accord.

The upper end of the casing B is formed with an internal screw-thread, into which is screwed a socket or receiver G for the plugger-holder H. This socket G is formed with a hole in its bottom, through which passes the reduced end $h$ of the plugger-holder H, and to the bottom of said end $h$ is secured a block I, the lower end of which is of spherical form, as shown, and between the upper end of the block I and the under side of the socket G is interposed a spiral spring J. Thus the plugger-holder H is held down in its normal position. The said plugger-holder H is hollow and formed with an internal screw-thread, into which is screwed the end of the plugger-tool K.

A small screw L is inserted in one side of the plugger-holder H, which screw projects into and works in a slot $l$, formed in the socket G, so as to cause the plugger-tool to work in a straight line and also to prevent the plugger-holder turning when the plugger-tool is being inserted or removed.

The casing A is at its lower end formed with an internal screw-thread, into which is screwed the blow-regulator, consisting of a tubular piece M, which is formed with an annular recess $m$, into which projects the end of a screw N, that passes through the casing A, so that after the tubular piece M has been adjusted said screw will hold it in position so that it cannot work loose. The upper portion of the tubular piece is also formed with two slots $m'$, diametrically opposite each other, in which works a pin P, that passes through a rod Q, that is free to slide in the tubular piece M. Upon the upper end of this rod Q is secured a block R, the upper end of which is of spherical form, as shown. The lower end of the rod Q is screw-threaded and fitted with a nut R', between which and the lower end of the tubular piece M is interposed a spiral spring S, so that the rod Q is held normally in its lowered position.

The rod Q may be operated to impart the blow by pneumatic, electric, mechanical, or manual power.

The operation is as follows: The casing B is first set to the required angle in relation to the casing A. The length of travel of the rod Q for imparting a blow to the block I on holder H, carrying the plugger-point K, is then set by adjusting the regulator or tubular piece M in the casing A. If long strokes are desired, then the regulator or tubular piece M is screwed in; but if short strokes are desired, then the regulator or tubular piece M is screwed out, the length of the stroke of the plugger being the distance the block I is pushed forward by the block R. Thus if the regulator or tubular piece M is adjusted as shown in Figs. 3, 4, and 5 a stroke of medium length will be given. It will be seen that by turning the regulator up into the casing A a long stroke of the tool-carrier will be produced and by turning said regulator or tubular piece M down a shorter stroke will be produced.. When the rod Q is operated or forced forward, the spherical end R comes into contact with the spherical end I of the tool-carrier, so as to impart a blow thereto, and by reason of the two spherical blocks R I the blow will be imparted equally at whatever angle the portions A B may be set, the length of the stroke being adjusted by the position of the regulator or tubular piece M in the casing A, as before described.

It will be seen that the casing of a dental plugger or mallet constructed as described can be readily adjusted to any required angle and the length of the stroke be easily adjusted.

What I claim is—

1. A dental plugger or mallet consisting of a two-part casing connected together by an angularly-disposed swivel-joint whereby one part of the casing may be adjusted to be parallel with or at any desired angle to the other part, a movable tool-carrier in the upper casing, a hemispherical block secured to the inner end of the carrier, a tool secured in said carrier and moved therewith, a plunger-rod in the lower casing, a hemispherical block on the inner end thereof, the said hemispherical blocks of the plunger and tool-carrier being always in such relation that the forward movement of the former brings the head of same into striking contact with the head of the latter, thereby imparting motion to the tool-carrier and tool substantially as set forth.

2. In a dental plugger or mallet a casing made in two parts connected together by an angularly-disposed swivel-joint, a tool-carrier in the upper portion of the casing, a hemispherical block secured to the inner end of the tool-carrier, a rod in the lower portion of the casing, a hemispherical block on the upper end of said rod whereby a blow is imparted by the inner hemispherical block to the outer one when said rod is operated, in combination with means for regulating the force of the blow substantially as set forth.

3. In a dental plugger or mallet consisting of an upper and lower casing connected together by an angularly-disposed swivel-joint, a rod in the lower casing, a hemispherical block secured on the upper end of said rod, a regulator in which said rod works, consisting of a tubular piece having an external screw-thread adjustable in a screw-thread in the lower casing in combination with a socket screwed into the upper casing, a tool-carrier working in said socket and a hemispherical block secured to the inner end of the tool-carrier substantially as set forth.

4. In a dental plugger or mallet of the character described a casing A, having an internal screw-thread, a blow-regulator consisting of a tubular piece M, having an external screw-thread that fits the screw in the casing A, an annular recess $m$, in said tubular piece M, and two slots $m'$, $m'$, near its upper end, a screw N, passing through the outer casing and entering the annular recess $m$, and a rod Q passing through the tubular piece M, a pin P, passing through said rod Q, its ends working in the slots $m'$, in the tubular piece M, whereby the length of the stroke of the plunger can be regulated as and for the purpose set forth.

5. In an angular dental plugger or mallet the body of which consists of two sections connected together by a coupling-ring having teeth upon its upper edge, a spring secured to the upper portion of the body and adapted to engage with the said teeth in the ring substantially as and for the purpose set forth.

6. In an angular dental plugger or mallet the body of which consists of two sections connected together by a coupling-ring having teeth on its under side, a slide free to work in a groove in the lower portion of the body and having teeth at its upper edge to engage with the teeth in the coupling-ring and a split ring encircling the lower section of the body for operating said slide substantially as and for the purpose set forth.

In testimony whereof I have signed my name to this specification, in the presence of two subscribing witnesses, on this 22d day of October, A. D. 1896.

FRANK L. MARSHALL.

Witnesses:
DE FOREST W. CHASE,
JAMES PATTERSON.